(12) United States Patent
Huang et al.

(10) Patent No.: US 12,127,242 B2
(45) Date of Patent: Oct. 22, 2024

(54) TRANSMISSION TIME IMPLICITLY TRIGGERING UCI MULTIPLEXING ON PUSCH WITH DIFFERENT PRIORITIES

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US); Ahmed Elshafie, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 17/447,563

(22) Filed: Sep. 13, 2021

(65) Prior Publication Data

US 2022/0095324 A1 Mar. 24, 2022

Related U.S. Application Data

(60) Provisional application No. 63/080,508, filed on Sep. 18, 2020.

(51) Int. Cl.
*H04W 72/566* (2023.01)
*H04L 5/00* (2006.01)
*H04W 72/1268* (2023.01)
*H04W 72/21* (2023.01)

(52) U.S. Cl.
CPC ......... *H04W 72/566* (2023.01); *H04L 5/0053* (2013.01); *H04W 72/1268* (2013.01); *H04W 72/21* (2023.01)

(58) Field of Classification Search
CPC ............... H04W 72/566; H04W 72/21; H04W 72/1268; H04L 5/0053
USPC ......................................................... 370/329
See application file for complete search history.

(56) References Cited

U.S. PATENT DOCUMENTS

| | | | |
|---|---|---|---|
| 2018/0302895 A1* | 10/2018 | Akkarakaran | H04L 5/0082 |
| 2021/0321394 A1* | 10/2021 | Li | H04L 1/007 |
| 2022/0029748 A1* | 1/2022 | Fu | H04L 5/0055 |
| 2023/0022663 A1* | 1/2023 | Zhang | H04W 72/56 |

* cited by examiner

*Primary Examiner* — Chi Tang P Cheng
(74) *Attorney, Agent, or Firm* — ArentFox Schiff LLP

(57) ABSTRACT

Aspects are provided which allow for multiplexing of higher priority uplink transmissions with lower priority uplink transmissions while maintaining URLLC of the higher priority uplink transmission. A UE receives from a base station information including resources for first and second uplink data, where at least a portion of the resources for the first and second uplink data overlap in time. The first and second uplink data are associated with different priority levels. The UE determines whether to multiplex the uplink data based on a transmission timing difference between a scheduled transmission time and a multiplexed transmission time for the second uplink data on the respective resources. The base station makes a similar determination. If the transmission timing difference fails to meet a delay threshold, multiplexing is performed; otherwise, the lower priority transmission is dropped. Thus, different priority multiplexing may occur in low latency situations, satisfying URLLC.

27 Claims, 10 Drawing Sheets

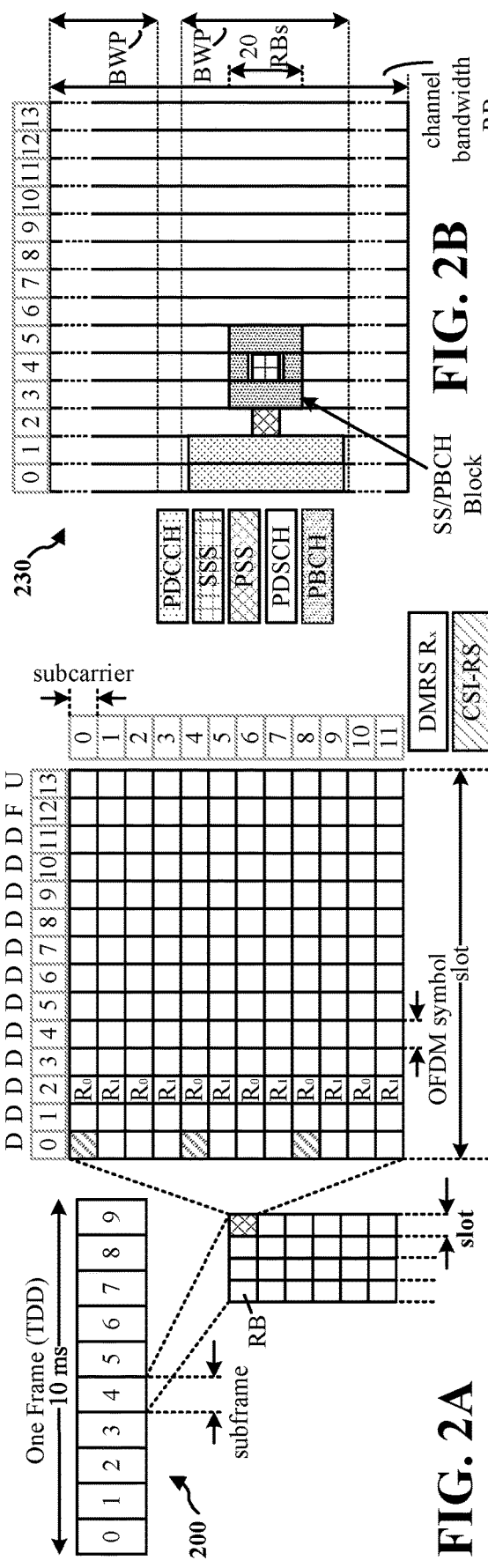
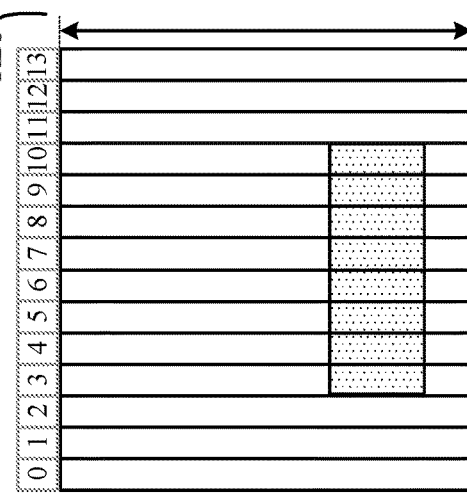
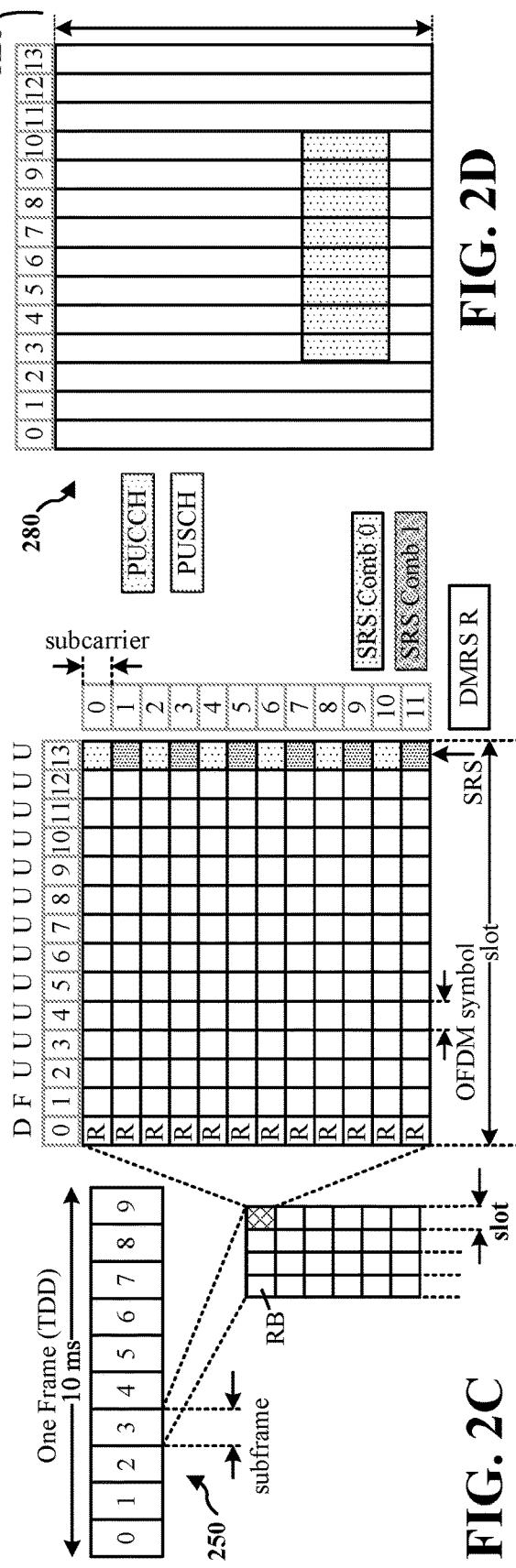
FIG. 2A  FIG. 2B  FIG. 2C  FIG. 2D

TRANSMISSION TIME IMPLICITLY TRIGGERING UCI MULTIPLEXING ON PUSCH WITH DIFFERENT PRIORITIES

CROSS REFERENCE TO RELATED APPLICATION(S)

This application claims the benefit of U.S. Provisional Application Ser. No. 63/080,508, entitled "TRANSMISSION TIME IMPLICITLY TRIGGERING UCI MULTIPLEXING ON PUSCH WITH DIFFERENT PRIORITIES" and filed on Sep. 18, 2020, the disclosure of which is expressly incorporated by reference herein in its entirety.

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus receives, from a base station, information including first resources for first uplink data and second resources for second uplink data, where at least a portion of the second resources overlaps in time with the first resources, and where the first uplink data and the second uplink data are associated with different priority levels. The apparatus determines whether to multiplex the second uplink data with the first uplink data based on a transmission timing difference between a scheduled transmission time for the second uplink data on the second resources and a multiplexed transmission time for the second uplink data on the first resources.

In another aspect of the disclosure, a method, a computer-readable medium, and an apparatus are provided. The apparatus may be a base station. The apparatus transmits, to a user equipment (UE), information including first resources for first uplink data and second resources for second uplink data, wherein at least a portion of the second resources overlaps in time with the first resources, and wherein the first uplink data and the second uplink data are associated with different priority levels. The apparatus determines whether the second uplink data is multiplexed with the first uplink data based on a transmission timing difference between a scheduled transmission time for the second uplink data on the second resources and a multiplexed transmission time for the second uplink data on the first resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
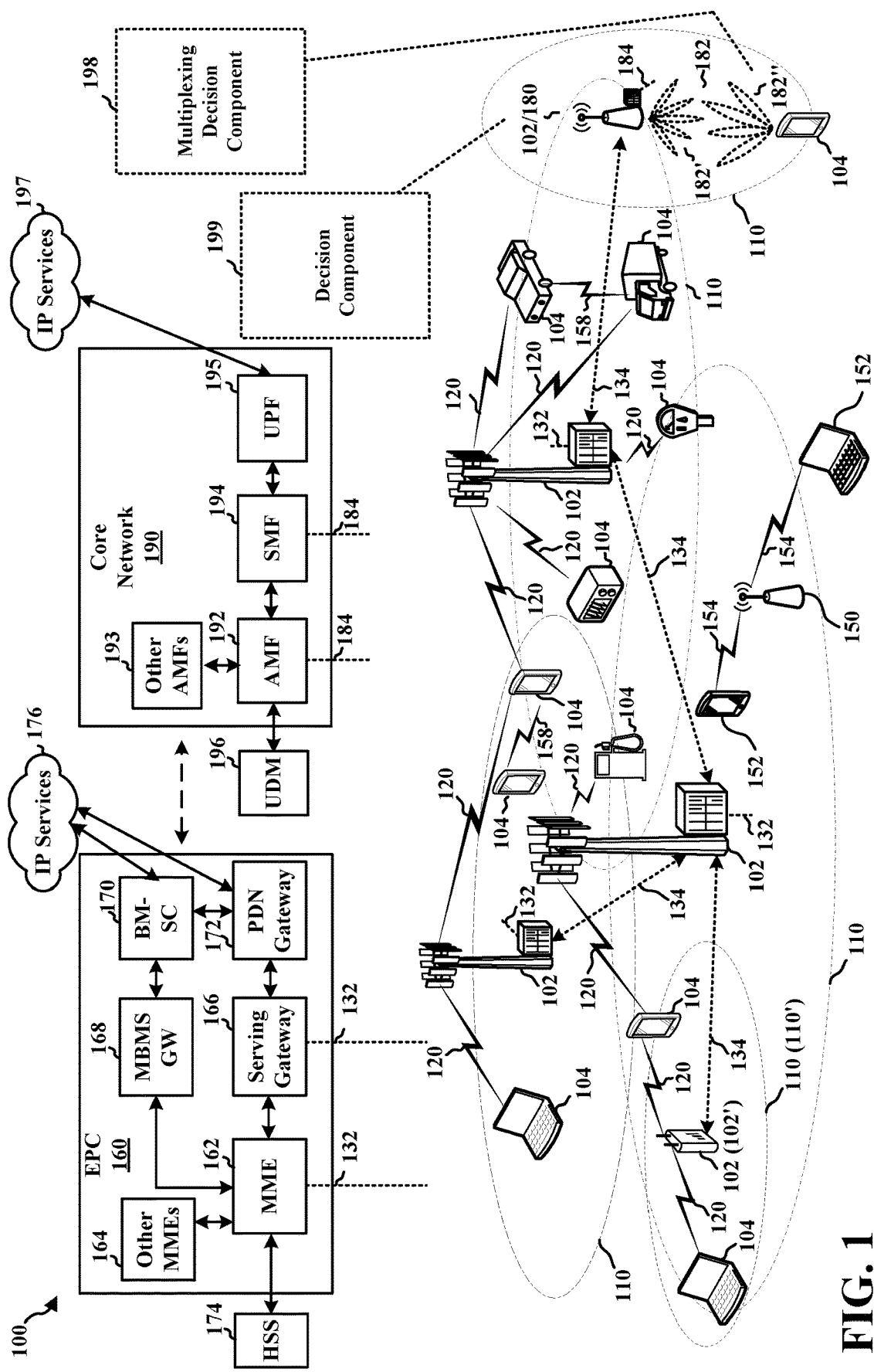
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a UE communicates with a base station, the UE may transmit uplink control information (UCI) to acknowledge downlink communications from a base station, request uplink resources, or report information on channel quality. When the UE is scheduled to transmit data on an uplink shared channel (UL-SCH) such as on a physical uplink shared channel (PUSCH), the UE generally transmits UCI on a physical uplink control channel (PUCCH). However, when the UCI on PUCCH overlaps in the time domain with the data on PUSCH, the UE multiplexes the UCI of the PUCCH with the data on PUSCH, and drops the PUCCH transmission. As a result, the UE may transmit UCI together with the data on PUSCH.

In some cases, the data that the UE is scheduled to transmit may comprise control information on PUCCH, and the UE may transmit UCI on a second PUCCH. For instance, the UE may transmit a hybrid automatic repeat request (HARQ) acknowledgment (HARQ-ACK) on a first PUCCH and channel state information (CSI) on a second PUCCH. In these cases, when the UCI on the second PUCCH overlaps in the time domain with the control information on the first PUCCH, the UE may also multiplex the UCI of the second PUCCH with the control information of the first PUCCH, and drop the second PUCCH transmission. As a result, the UE may also transmit UCI together with other control information on PUCCH.

An uplink transmission may be associated with different priority levels. For example, a base station may configure a PUSCH or a PUCCH transmission with a priority index 0 or a priority index 1. In one example, priority index 0 may indicate a higher priority, while priority index 1 may indicate a lower priority (or vice-versa). Typically, the UE multiplexes UCI when two uplink channels share the same priority level (e.g., PUCCH and PUSCH or multiple PUCCHs are both low priority transmissions or both high priority transmissions). In contrast, if the two uplink channels have different priority levels, the UE generally transmits only the high priority transmission and drops the low priority transmission, without UCI multiplexing. Since in some cases the low priority transmission that is dropped may include UCI, data including UCI may be lost in situations where uplink transmissions are associated with different priorities.

To prevent loss of UCI from dropped transmissions in such situations, one approach is for the base station to allow the UE to multiplex UCI even when overlapping PUCCH and PUSCH or multiple overlapping PUCCHs are associated with different priorities. For example, the base station may configure the UE to multiplex UCI with UL-SCH data on PUSCH or with control information on another PUCCH when the UCI is lower priority and the UL-SCH data or control information is higher priority, or when the UCI is higher priority and the UL-SCH data or control information is lower priority. However, while either example may successfully prevent loss of UCI, the latter example (i.e. higher priority UCI and lower priority UL-SCH data or control information) may not satisfy URLLC constraints for the higher priority transmission. In URLLC, high priority communications are expected to have low latency (as well as high reliability), but high priority UCI multiplexing with lower priority data may delay transmission of such communications. For example, if high priority UCI is scheduled on a PUCCH that occurs earlier in time than, but partially overlapping with, a PUSCH carrying scheduled low priority UL-SCH data or another PUCCH carrying low priority control information, then multiplexing the high priority UCI on the PUSCH or the other PUCCH would effectively cause transmission of the high priority UCI to occur later than initially scheduled. Although such delay from UCI multiplexing may satisfy URLLC in the case of lower priority UCI (since URLLC requirements for the higher priority UL-SCH data or control information may still be met), such delay from UCI multiplexing may not satisfy URLLC in the case of higher priority UCI (since the higher priority UCI may suffer from too much latency if the lower priority UL-SCH data or control information occurs much later in time than the high priority UCI).

Accordingly, to address this URLLC constraint in the case of higher priority UCI, aspects of the present disclosure allow the UE to determine whether to perform UCI multiplexing, and similarly for the base station to determine whether UCI multiplexing is performed, based on a transmission timing difference between the scheduled UCI transmission on PUCCH and the multiplexed UCI transmission on PUSCH (or on another PUCCH). In one example, the UE and base station may determine a transmission start time for the scheduled UCI on PUCCH (if not multiplexed) and a transmission start time for the multiplexed UCI on PUSCH (or another PUCCH). If the difference between the transmission start times is less than a threshold X (i.e. the delay caused by UCI multiplexing is relatively short), UCI multiplexing may be performed; otherwise, the lower priority transmission is dropped. In another example, the UE and base station may determine a transmission end time for the scheduled UCI on PUCCH (if not multiplexed) and a transmission end time for the multiplexed UCI on PUSCH (or another PUCCH). If the difference between the transmission end times is less than a threshold Y (i.e. the delay caused by UCI multiplexing is relatively short), UCI multiplexing may be performed; otherwise, the lower priority transmission is dropped. In a further example, the UE and base station may determine a transmission start time and a transmission end time for the scheduled UCI on PUCCH (if not multiplexed) and a transmission start time and a transmission end time for the multiplexed UCI on PUSCH (or another PUCCH). If the difference between the transmission start times is less than a threshold X and the difference between the transmission end times is less than a threshold Y (i.e. the delay caused by UCI multiplexing is relatively short), UCI multiplexing may be performed; otherwise, the lower priority transmission is dropped. In either example, the thresholds X and Y may be configured by the base station. Moreover, the base station may provide the UE an indication that such determinations based on transmission timing difference may even be performed (rather than the UE merely performing UCI multiplexing on a different priority channel irrespective of transmission timings).

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., M3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a multiplexing decision component 198 configured to receive, from a base station, information including first resources for first uplink data and second resources for second uplink data, wherein at least a portion of the second resources overlaps in time with the first resources, and wherein the first uplink data and the second uplink data are associated with different priority levels. The multiplexing decision component 198 may also be configured to determine whether to multiplex the second uplink data with the first uplink data based on a transmission timing difference between a scheduled transmission time for the second uplink data on the second resources and a multiplexed transmission time for the second uplink data on the first resources.

Still referring to FIG. 1, in certain aspects, the base station 180 may include a decision component 199 that is configured to transmit, to a UE, information including first resources for first uplink data and second resources for second uplink data, wherein at least a portion of the second resources overlaps in time with the first resources, and wherein the first uplink data and the second uplink data are associated with different priority levels. The decision component 199 may also be configured to determine whether the second uplink data is multiplexed with the first uplink data based on a transmission timing difference between a scheduled transmission time for the second uplink data on the second resources and a multiplexed transmission time for the second uplink data on the first resources.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
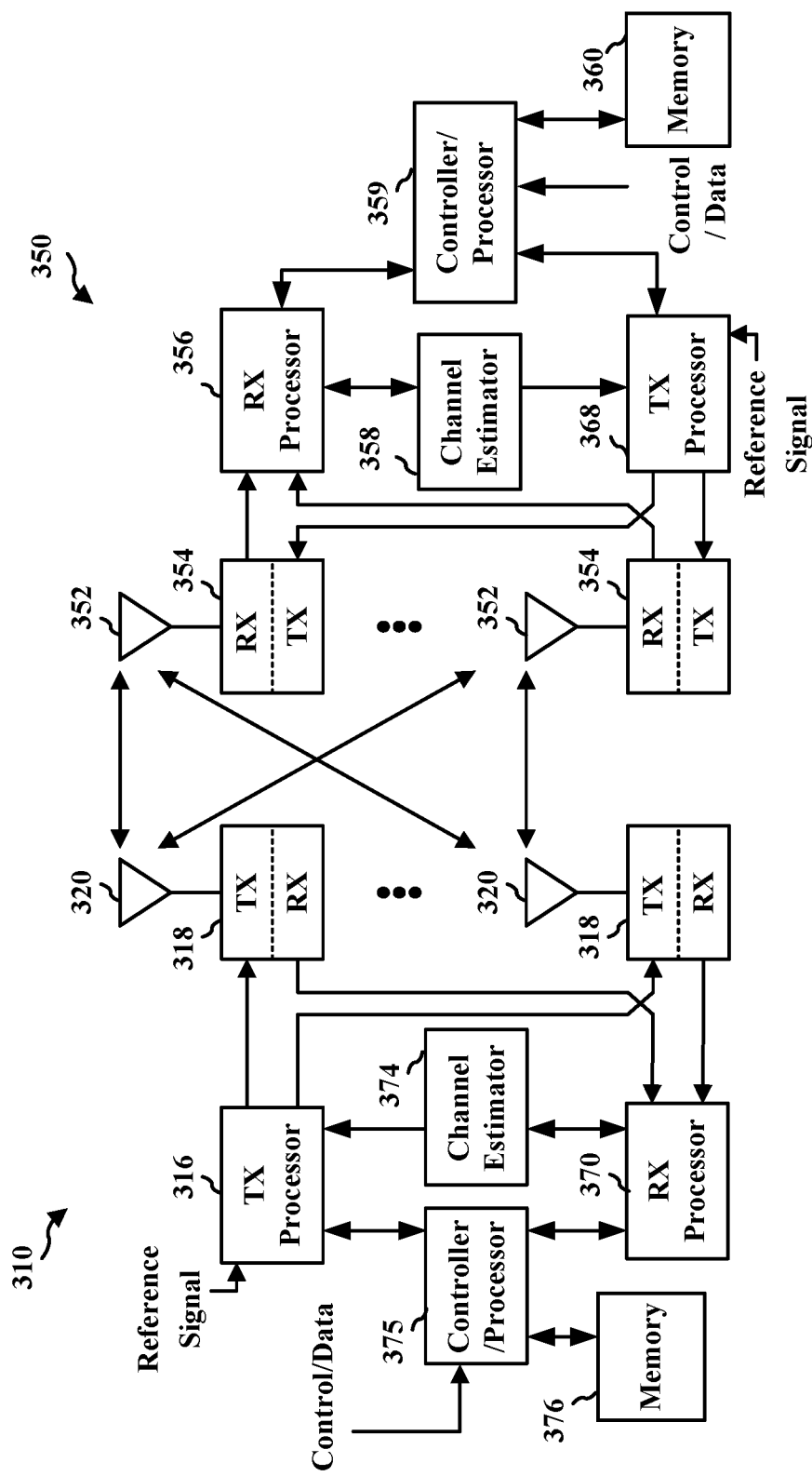
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with multiplexing decision component 198 of FIG. 1.

At least one of the TX processor 316, the RX processor 370, and the controller/processor 375 may be configured to perform aspects in connection with decision component 199 of FIG. 1.

When a UE communicates with a base station, the UE may transmit UCI to acknowledge downlink communications from a base station, request uplink resources, or report information on channel quality. For example, the UE may transmit HARQ-ACK/NACK in UCI in response to a PDSCH reception scheduled by DCI in PDCCH. In another example, the UE may transmit a SR in UCI during SR transmission occasions that are scheduled or configured by the base station. In a further example, the UE may transmit CSI reports in UCI.

Generally, when the UE is scheduled to transmit data on an UL-SCH, such as on a PUSCH, the UE transmits UCI on a PUCCH. However, when the UCI on PUCCH overlaps in the time domain with the data on PUSCH, the UE multiplexes the UCI of the PUCCH with the data on PUSCH, and drops the PUCCH transmission. As a result, the UE transmits UCI together with the data on PUSCH.

In some cases, the data that the UE is scheduled to transmit may comprise control information (e.g., UCI) on PUCCH, and the UE may transmit other UCI on a second PUCCH. For instance, the UE may transmit HARQ-ACK/NACK on a first PUCCH and CSI reports on a second PUCCH. However, when the UCI on the second PUCCH overlaps in the time domain with the control information on the first PUCCH, the UE may multiplex the UCI of the second PUCCH with the control information of the first PUCCH, and drop the second PUCCH transmission. As a result, the UE may also transmit UCI together with other control information on PUCCH.

Figure 4:
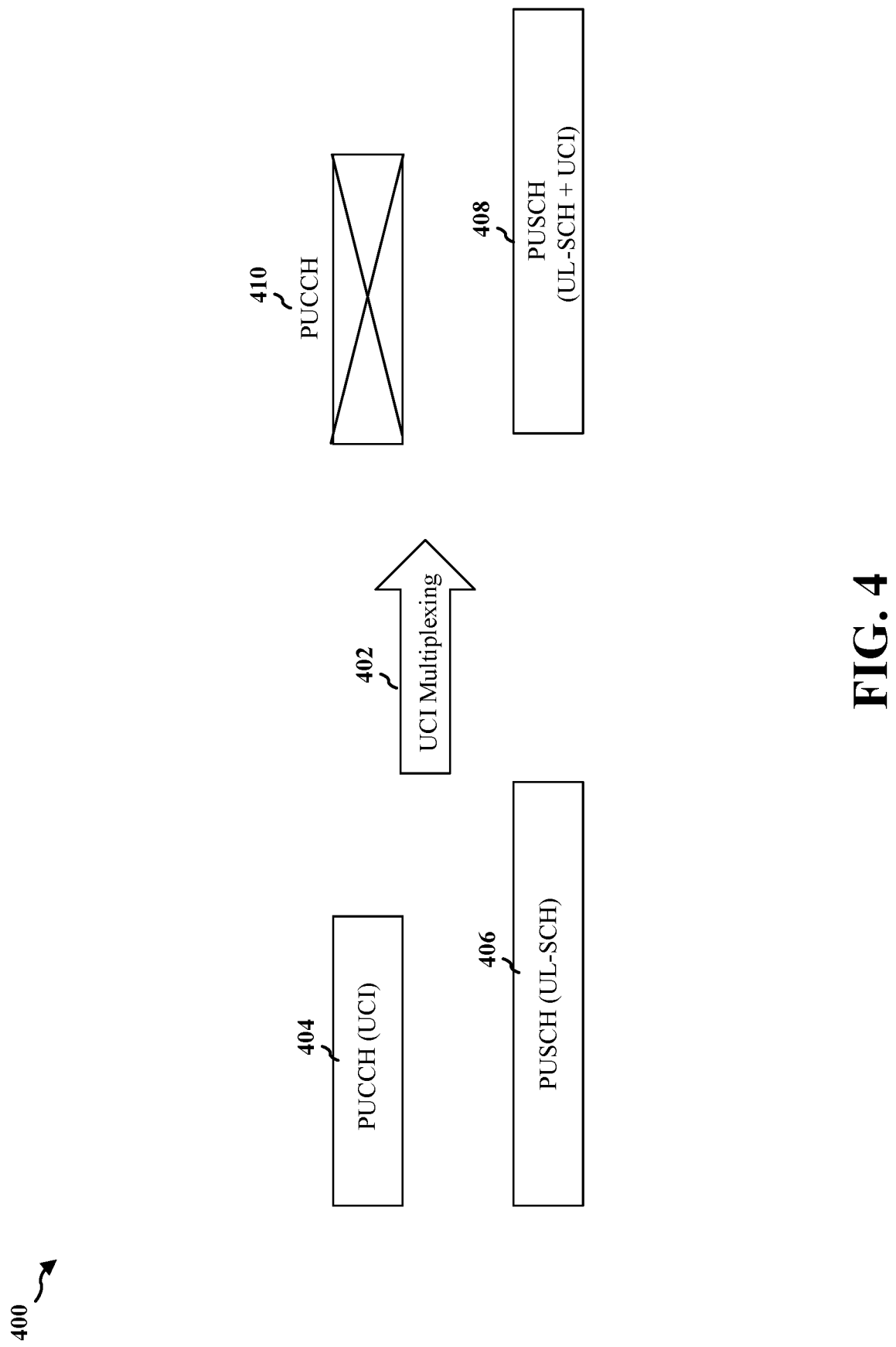
FIG. 4 is a diagram illustrating an example of uplink control information (UCI) multiplexing on a physical uplink shared channel (PUSCH).

FIG. 4 illustrates an example 400 of UCI multiplexing 402 when UCI on a PUCCH 404 overlaps in time with UL-SCH data on a PUSCH 406. The UL-SCH data may include, for instance, uplink data scheduled by the base station in an uplink grant, or other information. When at least one symbol of the UCI overlaps in time with at least one symbol of the UL-SCH data, the UE multiplexes the UCI on PUCCH 404 with the UL-SCH data on PUSCH 406 (as illustrated by multiplexed PUSCH transmission 408) and drops the transmission of the PUCCH 404 (as illustrated by dropped PUCCH transmission 410). For example, the UE may multiplex HARQ-ACK information and CSI reports, if any, from the UCI in the PUSCH transmission and may not transmit the PUCCH. While the illustrated example of FIG. 4 refers to UCI multiplexing in PUSCH when the UE transmits overlapping PUCCH and PUSCH in a slot, the UE may similarly multiplex UCI in PUCCH when the UE transmits multiple overlapping PUCCHs. For example, if a UE would transmit multiple overlapping PUCCHs in a slot, the UE may multiplex different UCI types (e.g., HARQ-ACK, SR, or CSI) in one PUCCH in response to a DCI format detection by the UE.

An uplink transmission may also be associated with different priority levels. For example, a base station may configure a PUSCH or a PUCCH transmission with a priority index 0 or a priority index 1. In one example, priority index 0 may indicate a higher priority, while priority index 1 may indicate a lower priority (or vice-versa). The UE may determine a priority index based on information provided by the base station. For example, for a configured grant PUSCH transmission, the UE may determine the priority index from a parameter priority (or some other name), if provided. For a PUCCH transmission with HARQ-ACK information corresponding to a semi-persistently scheduled (SPS) PDSCH reception or a SPS PDSCH release, the UE may determine the priority index from a parameter harq-CodebookID (or some other name), if provided. The UE may also determine the priority index from a priority indicator field in DCI. If a priority index is not provided to the UE for a PUSCH or a PUCCH transmission, the UE may determine the priority index for that transmission to indicate the higher priority (e.g., 0).

Typically, the UE multiplexes UCI when two uplink channels share the same priority level (e.g., PUCCH and PUSCH or multiple PUCCHs are both low priority transmissions or high priority transmissions). For example, a UE may multiplex UCIs with the same priority index (e.g., priority index 0 or priority index 1) in a PUCCH. In contrast, if the two uplink channels have different priority levels, the UE transmits only the high priority transmission and drops the low priority transmission, without UCI multiplexing. For example, if the UE determines to transmit a first PUCCH of larger priority index scheduled by a first DCI format in a first PDCCH reception, and the UE determines to transmit a PUSCH or a second PUCCH of smaller priority index that would overlap in time with the transmission of the first PUCCH, the UE may cancel the transmission of the PUSCH or the second PUCCH. In other examples, if the UE would transmit (a) a first PUCCH of larger priority index with SR and a second PUCCH or PUSCH of smaller priority index, (b) a configured grant PUSCH of larger priority index and a PUCCH of smaller priority index, (c) a first PUCCH of larger priority index with HARQ-ACK information and a second PUCCH of smaller priority index with SR and/or CSI, (d) a PUSCH of larger priority index with SP-CSI reports and a PUCCH of smaller priority index with SR, CSI, or HARQ-ACK information, or (e) a configured grant PUSCH of larger priority index and a configured PUSCH of lower priority index on a same serving cell, the UE may cancel the PUCCH/PUSCH transmissions of smaller priority index. Thus, data including UCI may be lost in situations where uplink transmissions are associated with different priorities.

To prevent loss of UCI from dropped transmissions in such situations, one approach is for the base station to allow the UE to multiplex UCI when overlapping PUCCH and PUSCH or multiple overlapping PUCCHs are associated with different priorities. For example, the base station may configure the UE to multiplex UCI with UL-SCH data on PUSCH or with control information on another PUCCH as described above similarly when the UCI is lower priority and the UL-SCH data or control information is higher priority, or when the UCI is higher priority and the UL-SCH data or control information is lower priority. However, while either example may successfully prevent loss of UCI, the latter example (i.e. higher priority UCI and lower priority UL-SCH data or control information) may not satisfy URLLC constraints for the higher priority transmission.

In URLLC, high priority communications are expected to have low latency (as well as high reliability), but high priority UCI multiplexing with lower priority data may delay transmission of such communications. For example, if high priority UCI is scheduled on a PUCCH that occurs earlier in time than, but partially overlapping with, a PUSCH carrying scheduled low priority UL-SCH data or another PUCCH carrying low priority control information, then multiplexing the high priority UCI on PUSCH or the other PUCCH would effectively cause transmission of the high priority UCI to occur later than initially scheduled. Although such delay from UCI multiplexing may satisfy URLLC in the case of lower priority UCI (since URLLC requirements for the higher priority UL-SCH data or control information may still be met), such delay from UCI multiplexing may not satisfy URLLC in the case of higher priority UCI (since the higher priority UCI may suffer from too much latency if the lower priority UL-SCH data or control information occurs much later in time than the high priority UCI).

Accordingly, to address this URLLC constraint in the case of higher priority UCI, aspects of the present disclosure allow the UE to determine whether to perform UCI multiplexing, and similarly for the base station to determine whether UCI multiplexing is performed, based on a transmission timing difference between the scheduled UCI transmission on PUCCH and the multiplexed UCI transmission on PUSCH (or on another PUCCH). In one example, the UE and base station may determine a transmission start time for the scheduled UCI on PUCCH (if not multiplexed) and a transmission start time for the multiplexed UCI on PUSCH (or another PUCCH). If the difference between the transmission start times is less than a threshold X (i.e. the delay caused by UCI multiplexing is relatively short), UCI multiplexing may be performed; otherwise, the lower priority transmission (the PUSCH or other PUCCH) is dropped. In another example, the UE and base station may determine a transmission end time for the scheduled UCI on PUCCH (if not multiplexed) and a transmission end time for the multiplexed UCI on PUSCH (or another PUCCH). If the difference between the transmission end times is less than a threshold Y (i.e. the delay caused by UCI multiplexing is relatively short), UCI multiplexing may be performed; otherwise, the lower priority transmission (the PUSCH or other PUCCH) is dropped. In a further example, the UE and base station may determine a transmission start time and a transmission end time for the scheduled UCI on PUCCH (if not multiplexed) and a transmission start time and a transmission end time for the multiplexed UCI on PUSCH (or another PUCCH). If the difference between the transmission start times is less than a threshold X and the difference between the transmission end times is less than a threshold Y (i.e. the delay caused by UCI multiplexing is relatively short), UCI multiplexing may be performed; otherwise, the lower priority transmission (the PUSCH or other PUCCH) is dropped. In either example, the thresholds X and Y may be configured by the base station. Moreover, the base station may provide the UE an indication that such determinations based on transmission timing difference may even be performed (rather than the UE merely performing UCI multiplexing on a different priority channel irrespective of transmission timings).

Figure 5:
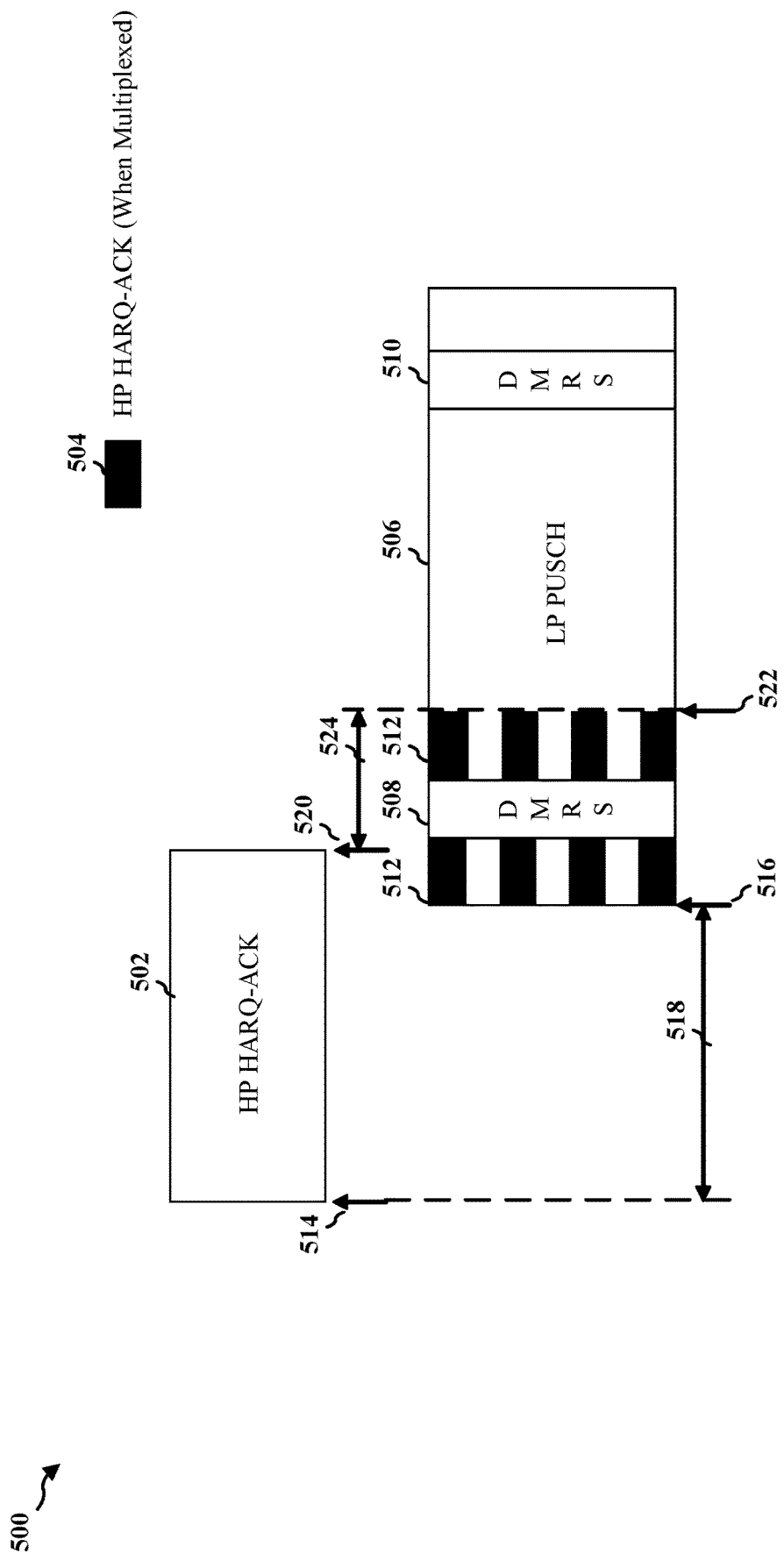
FIG. 5 is a diagram illustrating an example of higher priority (HP) UCI multiplexing on lower priority (LP) PUSCH based on transmission timing differences between a scheduled transmission time for the UCI and a multiplexed transmission time for the UCI.

FIG. 5 illustrates an example 500 of UCI multiplexing based on transmission timing differences between scheduled UCI 502 on PUCCH and multiplexed UCI 504 on PUSCH 506. Scheduled UCI 502 may be higher priority than uplink transmissions on PUSCH 506. In this example, the scheduled UCI includes a HARQ-ACK associated with a high priority index, although in other examples, the UCI may include SR and/or CSI in addition to, or alternatively to, the HARQ-ACK. In the example of FIG. 5, at least a portion of scheduled UCI 502 on PUCCH may overlap in time with data on PUSCH 506. For instance, as illustrated in FIG. 5, at least one symbol of the HARQ-ACK may overlap in time with at least one symbol of UL-SCH data on the PUSCH 506.

In addition to transmitting UL-SCH data on PUSCH 506, the UE may transmit DMRS in different symbols of the PUSCH, including a first DMRS 508 earlier in time and a second DMRS 510 later in time. To provide lower latency (and higher reliability) to multiplexed UCI 504 per URLLC, the UE may transmit the multiplexed UCI in symbols 512 closer to the first DMRS 508 than to the second DMRS 510, such as illustrated in FIG. 5. The transmission of multiplexed UCI 504 in symbols 512 closer to the first DMRS 508 may provide lower latency in communication than if the multiplexed UCI was transmitted in symbols closer to the second DMRS 510.

To determine whether to transmit the higher priority scheduled UCI 502 on PUCCH (and drop the lower priority PUSCH transmission), or whether to multiplex the UCI and transmit multiplexed UCI 504 on PUSCH 506 (and cancel the PUCCH transmission), the UE may compare one or more transmission timing differences between the scheduled UCI and the multiplexed UCI against one or more thresholds. The threshold(s) may be timeline-related value(s) configured by the base station (e.g., via RRC), including a transmission start delay threshold (e.g., X) and/or a transmission end delay threshold (e.g., Y). The base station may provide an indication to the UE that configures (e.g., triggers, enables, or allows) the UE, as well as the base station, to make this determination.

In one example, the UE and base station may determine a transmission start time 514 for scheduled UCI 502 (if not multiplexed on PUSCH 506) and a transmission start time 516 for multiplexed UCI 504 on PUSCH. For instance, transmission start time 514 may represent a time corresponding to a first symbol of a HARQ-ACK triggered in response to a PDSCH reception scheduled by PDCCH, while transmission start time 516 may represent a time corresponding to a first symbol of the HARQ-ACK if the HARQ-ACK is multiplexed with UL-SCH data on PUSCH 506. If a transmission timing difference 518 between the transmission start times 514, 516 does not meet a transmission start delay threshold (the UCI transmission start time delay is less than X), the UE and base station may determine that the delay caused by multiplexing UCI is not significant, and therefore the UE may multiplex the higher priority UCI with the lower priority data on PUSCH 506 and cancel the PUCCH transmission. On the other hand, if the transmission timing difference 518 between the transmission start times 514, 516 meets the transmission start delay threshold (the UCI transmission start time delay is greater than or equal to X), the UE and base station may determine that the delay caused by multiplexing UCI is too long for satisfying URLLC, and therefore the UE may transmit scheduled UCI 502 and drop the lower priority transmission on PUSCH 506.

In another example, the UE and base station may determine a transmission end time 520 for scheduled UCI 502 (if not multiplexed on PUSCH 506) and a transmission end time 522 for multiplexed UCI 504 on PUSCH. For instance, transmission end time 520 may represent a time corresponding to a last symbol of a HARQ-ACK triggered in response to a PDSCH reception scheduled by PDCCH, while transmission end time 522 may represent a time corresponding to a last symbol of the HARQ-ACK if the HARQ-ACK is multiplexed with UL-SCH data on PUSCH 506. If a transmission timing difference 524 between the transmission end times 520, 522 does not meet a transmission end delay threshold (the UCI transmission end time delay is less than Y), the UE and base station may determine that the delay caused by multiplexing UCI is not significant, and therefore the UE may multiplex the higher priority UCI with the lower priority data on PUSCH 506 and cancel the PUCCH transmission. On the other hand, if the transmission timing difference 524 between the transmission end times 520, 522 meets the transmission end delay threshold (the UCI transmission end time delay is greater than or equal to Y), the UE and base station may determine that the delay caused by multiplexing UCI is too long for satisfying URLLC, and therefore the UE may transmit scheduled UCI 502 and drop the lower priority transmission on PUSCH 506.

In a further example, the UE and base station may determine both the transmission start time 514 and transmission end time 520 for scheduled UCI 502 (if not multiplexed on PUSCH 506) and the transmission start time 516 and transmission end time 522 for multiplexed UCI 504 on PUSCH. If the transmission timing difference 518 between the transmission start times 514, 516 and the transmission timing difference 524 between the transmission end times 520, 522 does not meet the transmission start delay threshold and transmission end delay threshold, respectively (the UCI transmission start time delay is less than X and the UCI transmission end time delay is less than Y), the UE and base station may determine that the delay caused by multiplexing UCI is not significant, and therefore the UE may multiplex the higher priority UCI with the lower priority data on PUSCH 506 and cancel the PUCCH transmission. On the other hand, if either the transmission timing difference 518 between the transmission start times 514, 516 or the transmission timing difference 524 between the transmission end times 520, 522 does meet the transmission start delay threshold and transmission end delay threshold, respectively (the UCI transmission start time delay is greater than or equal to X or the UCI transmission end time delay is greater than or equal to Y), the UE and base station may determine that the delay caused by multiplexing UCI is too long for satisfying URLLC, and therefore the UE may transmit scheduled UCI 502 and drop the lower priority transmission on PUSCH 506.

While the aforementioned aspects relate to multiplexing UCI in the case of overlapping PUCCH and PUSCH as illustrated in the example of FIG. 5, these aspects may similarly relate to multiplexing UCI in the case of multiple overlapping PUCCHs. For example, the determination whether to transmit scheduled UCI 502 or multiplexed UCI 504 based on transmission timing differences may similarly apply when the HARQ-ACK is on a first PUCCH and another uplink transmission (e.g., CSI) is on a second PUCCH (rather than on PUSCH 506). In such case, the UE and base station may similarly determine that the higher priority UCI is multiplexed with the lower priority data on the second PUCCH and cancel the PUCCH transmission accordingly, or that scheduled UCI 502 is transmitted and the lower priority transmission on the second PUCCH is dropped, respectively based on transmission timing difference(s) 518, 524.

Figure 6:
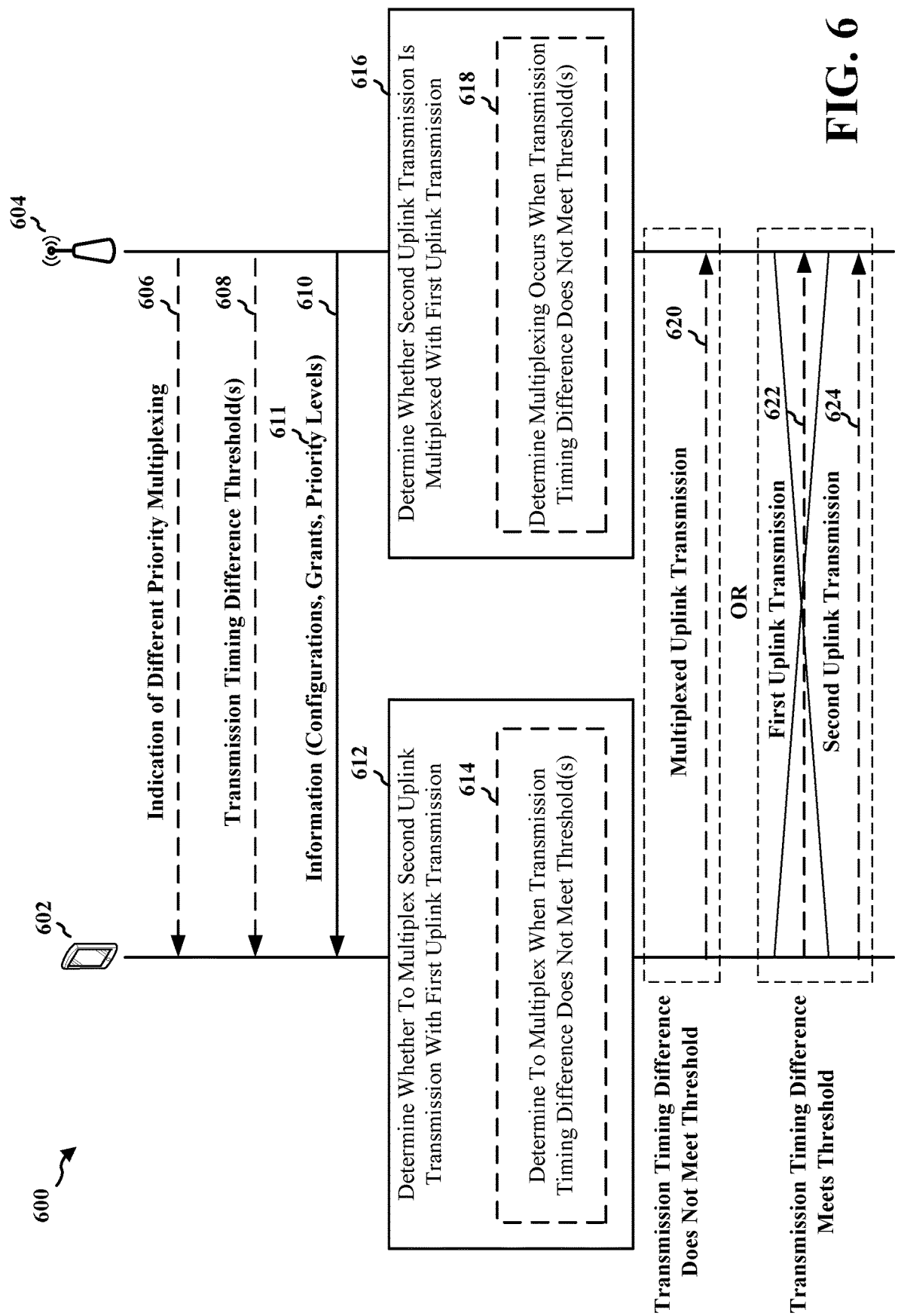
FIG. 6 is a diagram illustrating a call flow between a UE and a base station.

FIG. 6 illustrates an example 600 of a call flow between a UE 602 and a base station 604. The UE may receive an indication 606 from the base station that configures (e.g., triggers, enables or allows) the UE to perform UCI multiplexing based on transmission timing differences between a higher priority scheduled UCI and a multiplexed UCI on a lower priority uplink channel (e.g., an overlapping PUSCH or PUCCH). For example, the indication 606 may be a flag, bit, or field in a RRC message, a DCI, or some other message that, when set to one value, configures the UE to perform UCI multiplexing based on the transmission timing differences, and when reset to another value, configures the UE to perform UCI multiplexing regardless of the transmission timing differences (e.g., based on a determination of priority levels as described above). The UE 602 may also receive one or more transmission timing difference thresholds 608 from the base station 604 that the UE may compare against the transmission timing differences, to determine whether to multiplex high priority UCI in the lower priority transmission or to drop the lower priority transmission. The transmission timing difference threshold(s) 608 may be timeline-related value(s) configured by the base station (e.g., via a RRC message or some other message), including a transmission start delay threshold (e.g., X) and/or a transmission end delay threshold (e.g., Y).

The UE 602 may receive information 610 from the base station 604 scheduling a first uplink transmission 622 (e.g., lower priority data) and a second uplink transmission 624 (e.g., higher priority UCI). For example, information 610 scheduling the second uplink transmission (the higher priority UCI) may include a grant or DCI scheduling CSI report(s), a grant or DCI scheduling a PDSCH that triggers a HARQ-ACK/NACK, and/or a configuration scheduling SR transmission occasions for SR. For instance, referring to FIGS. 4 and 5, information 610 include a grant that may schedule UCI on PUCCH 404 (e.g., scheduled UCI 502). Moreover, information 610 scheduling the first uplink transmission 622 (the lower priority uplink transmission) may include a separate grant or DCI scheduling UL-SCH data (e.g., on PUSCH) or control information (e.g., other UCI on PUCCH). For instance, referring to FIGS. 4 and 5, information 610 may include another grant that may schedule UL-SCH data on PUSCH 406, 506. Information 610 may also include RRC configurations scheduling periodic or semi-persistently scheduled higher priority UCI or lower priority uplink transmissions. Moreover, information 610 may include priority levels 611 associated with the higher priority UCI or the lower priority uplink transmission. For example, information 610 may include an RRC configuration or parameter, or a DCI priority indicator field, that indicates a priority index for the uplink transmissions (e.g., priority index 0 for the first uplink transmission and priority index 1 for the second uplink transmission, or vice-versa).

At 612, the UE 602 may determine whether to multiplex the second uplink transmission 624 with the first uplink transmission 622. For example, at 614, the UE may determine to multiplex higher priority UCI with lower priority UL-SCH data or control information when a transmission timing difference between a scheduled transmission time for the higher priority UCI and a multiplexed transmission time for the higher priority UCI does not meet one or more thresholds. Similarly, at 616, the base station may determine whether the UE will multiplex the second uplink transmission with the first uplink transmission. For example, at 618, the base station may determine that the UE will multiplex higher priority UCI with lower priority UL-SCH data or control information when a transmission timing difference between a scheduled transmission time for the higher priority UCI and a multiplexed transmission time for the higher priority UCI does not meet one or more thresholds. For instance, referring to FIG. 5, the UE and base station may determine the transmission start time 514 for scheduled UCI 502 on PUCCH and the transmission start time 516 for multiplexed UCI 504 on PUSCH 506, identify the transmission timing difference 518 based on the transmission start times 514, 516, and compare the transmission timing difference 518 against the transmission start delay threshold (X). Alternatively or additionally, the UE and base station may determine the transmission end time 520 for scheduled UCI 502 on PUCCH and the transmission end time 522 for multiplexed UCI 504 on PUSCH 506, identify the transmission timing difference 524 based on the transmission end times 520, 522, and compare the transmission timing difference 524 against the transmission end delay threshold (Y).

If the transmission timing difference(s) 518, 524 are less than the respective threshold(s), the UE 602 may determine to multiplex, and the base station 604 may determine that the UE will multiplex, the higher priority UCI with the lower priority data on PUSCH 506 (or the other PUCCH) and cancel the PUCCH transmission. Thus, the UE may transmit and the base station may receive multiplexed uplink transmission 620. Otherwise, the UE may drop the lower priority transmission (i.e. first uplink transmission 622) and transmit the higher priority scheduled UCI on PUCCH (i.e. the second uplink transmission 624) without UCI multiplexing. In this way, higher priority UCI may be multiplexed with lower priority transmissions while still maintaining URLLC.

Figure 7:
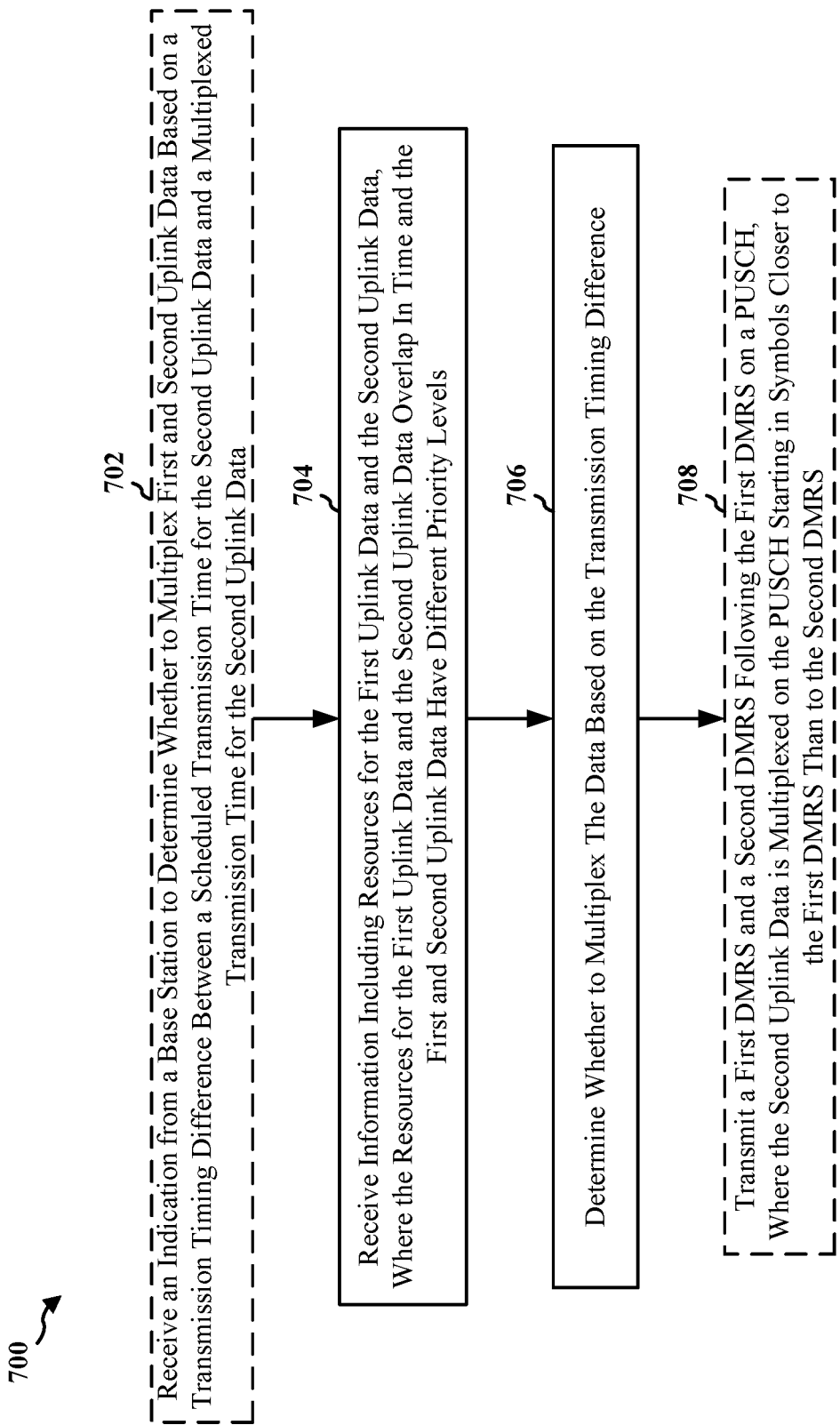
FIG. 7 is a flowchart of a method of wireless communication at a UE.

FIG. 7 is a flowchart 700 of a method of wireless communication. The method may be performed by a UE (e.g., the UE 104, 350, 602; the apparatus 802). Optional aspects are illustrated in dashed lines. The method allows a UE to determine whether to drop lower priority, first uplink data (e.g., UL-SCH data or control information), or to multiplex higher priority, second uplink data (UCI) at least partially overlapping with the lower priority first uplink data, based on a transmission timing difference between scheduled and multiplexed transmission times of the second uplink data.

At 702, the UE may receive an indication from a base station to determine whether to multiplex the second uplink data with the first uplink data based on the transmission timing difference. For example, 702 may be performed by indication component 844. For instance, referring to FIG. 6, UE 602 may receive an indication 606 from base station 604 that configures (e.g., triggers, enables or allows) the UE to perform UCI multiplexing based on transmission timing differences between a higher priority scheduled UCI and a multiplexed UCI on a lower priority uplink channel (e.g., an overlapping PUSCH or PUCCH).

At 704, the UE receives from a base station information including first resources for the first uplink data and second resources for the second uplink data, where at least a portion of the second resources overlaps in time with the first resources. For example, 704 may be performed by information component 840. In one example, the first uplink data may comprise data scheduled for transmission in the first resources on a PUSCH, and the second uplink data may comprise UCI scheduled for transmission in the second resources on a PUCCH. For instance, the second uplink data may include a HARQ-ACK. For example, referring to FIGS. 4-6, UE 602 may receive information 610 from base station 604 scheduling first uplink transmission 622 in allocated time-frequency resources, such as a grant scheduling UL-SCH data in slots, symbols, or RBs of PUSCH 406, 506, and information 610 scheduling second uplink transmission 624 in allocated time-frequency resources, such as another grant scheduling UCI (e.g., HARQ-ACK) in slots, symbols, or RBs of PUCCH 404 (e.g., scheduled UCI 502). Moreover, referring to FIG. 5, at least a portion of the resources including scheduled UCI 502 on PUCCH may overlap in time with the resources including data on PUSCH 506. For instance, as illustrated in FIG. 5, at least one symbol of the HARQ-ACK may overlap in time with at least one symbol of UL-SCH data on the PUSCH 506.

In another example, the first uplink data may comprise first UCI scheduled for transmission in the first resources on a first PUCCH, and the second uplink data may comprise second UCI scheduled for transmission in the second resources on a second PUCCH. For example, UE 602 may receive information 610 from base station 604 scheduling first uplink transmission 622, such as a grant scheduling UCI on PUCCH, and information 610 scheduling second uplink transmission 624, such as another grant scheduling another UCI (e.g., HARQ-ACK) on another PUCCH (e.g., scheduled UCI 502). Moreover, similar to the example shown in FIG. 5, at least a portion of scheduled UCI 502 on PUCCH may overlap in time with the other UCI on the other PUCCH.

The first uplink data and the second uplink data are associated with different priority levels. For instance, the different priority levels may include a first priority level associated with the first uplink data and a second priority level associated with the second uplink data, where the second priority level is higher than the first priority level. For example, referring to FIG. 5, the UL-SCH data on PUSCH 506 may be associated with a low priority index (e.g., priority index 1), while scheduled UCI 502 may include a HARQ-ACK configured with a high priority index (e.g., priority index 0). Moreover, referring to FIG. 6, the priority levels 611 associated with the higher priority UCI or lower priority uplink transmission may be provided in information 610. For example, information 610 may include an RRC configuration or parameter, or a DCI priority indicator field, that indicates a priority index for each of the uplink transmissions (e.g., priority index 1 for the first uplink transmission and priority index 0 for the second uplink transmission).

At 706, the UE determines whether to multiplex the second uplink data with the first uplink data based on the transmission timing difference between a scheduled transmission time for the second uplink data on the second resources and a multiplexed transmission time for the second uplink data on the first resources. For example, 706 may be performed by determination component 842. The UE may determine to multiplex the second uplink data with the first uplink data when the transmission timing difference is smaller than a threshold. The threshold may be received in a RRC configuration from the base station. For example, referring to FIG. 6, at 612, UE 602 may determine whether to multiplex the second uplink transmission 624 with the first uplink transmission 622. In particular, referring to FIG. 5, the UE may determine whether to transmit the higher priority scheduled UCI 502 on PUCCH (and drop the lower priority PUSCH transmission), or whether to multiplex the UCI and transmit multiplexed UCI 504 on PUSCH 506 (and cancel the PUCCH transmission) by comparing one or more transmission timing differences 518, 524 between the scheduled UCI 502 and the multiplexed UCI 504 against one or more thresholds. For example, referring to FIG. 6, at 614, the UE may determine to multiplex higher priority UCI with lower priority UL-SCH data or control information when a transmission timing difference between a scheduled transmission time for the higher priority UCI and a multiplexed transmission time for the higher priority UCI is smaller than one or more transmission timing difference thresholds 608. The threshold(s) may be timeline-related value(s) configured by the base station (e.g. via RRC), including a transmission start delay threshold (e.g. X) and/or a transmission end delay threshold (e.g. Y).

In one example, the scheduled transmission time may comprise a scheduled start time of the second uplink data and the multiplexed transmission time may comprise a multiplexed start time of the second uplink data. In another example, the scheduled transmission time may comprise a scheduled end time of the second uplink data and the multiplexed transmission time may comprise a multiplexed end time of the second uplink data. In a further example, the scheduled transmission time may comprise a scheduled end time of the second uplink data and the multiplexed transmission time may comprise a multiplexed end time of the second uplink data, and the determining at 706 may be further based on another transmission timing difference between a scheduled start time of the second uplink data and a multiplexed start time of the second uplink data. For instance, referring to FIG. 5, the UE and base station may determine the transmission start time 514 for scheduled UCI 502 on PUCCH and the transmission start time 516 for multiplexed UCI 504 on PUSCH 506, identify the transmission timing difference 518 based on the transmission start times 514, 516, and compare the transmission timing difference 518 against the transmission start delay threshold (X). Alternatively or additionally, the UE and base station may determine the transmission end time 520 for scheduled UCI 502 on PUCCH and the transmission end time 522 for multiplexed UCI 504 on PUSCH 506, identify the transmission timing difference 524 based on the transmission end times 520, 522, and compare the transmission timing difference 524 against the transmission end delay threshold (Y). If the transmission timing difference(s) 518, 524 are less than the respective threshold(s) 608, the UE 602 may determine to multiplex the higher priority UCI with the lower priority data on PUSCH 506 (or on the other PUCCH) and cancel the PUCCH transmission. Thus, the UE may transmit and the base station may receive multiplexed uplink transmission 620. Otherwise, the UE may drop the lower priority PUSCH (or PUCCH) transmission (i.e. first uplink transmission 622) and transmit the higher priority scheduled UCI on PUCCH (i.e. the second uplink transmission 624) without UCI multiplexing.

The determining at 706 may also be based on the indication received at 702. For instance, referring to FIG. 6, indication 606 may be a flag, bit, or field in a RRC message, a DCI, or some other message that, when set to one value, configures the UE to perform UCI multiplexing based on the transmission timing differences, and when reset to another value, configures the UE to perform UCI multiplexing regardless of the transmission timing differences.

Finally, at 708, the UE may transmit a first DMRS and a second DMRS following the first DMRS on a PUSCH. For example, 708 may be performed by DMRS component 846. The second uplink data may be multiplexed on the PUSCH starting in symbols closer to the first DMRS than to the second DMRS. For instance, referring to FIG. 5, in addition to transmitting UL-SCH data on PUSCH 506, the UE may transmit DMRS in different symbols of the PUSCH, including a first DMRS 508 earlier in time and a second DMRS 510 later in time. To provide lower latency (and higher reliability) to multiplexed UCI 504 per URLLC, the UE may transmit the multiplexed UCI starting in symbols 512 closer to the first DMRS 508 than to the second DMRS 510.

Figure 8:
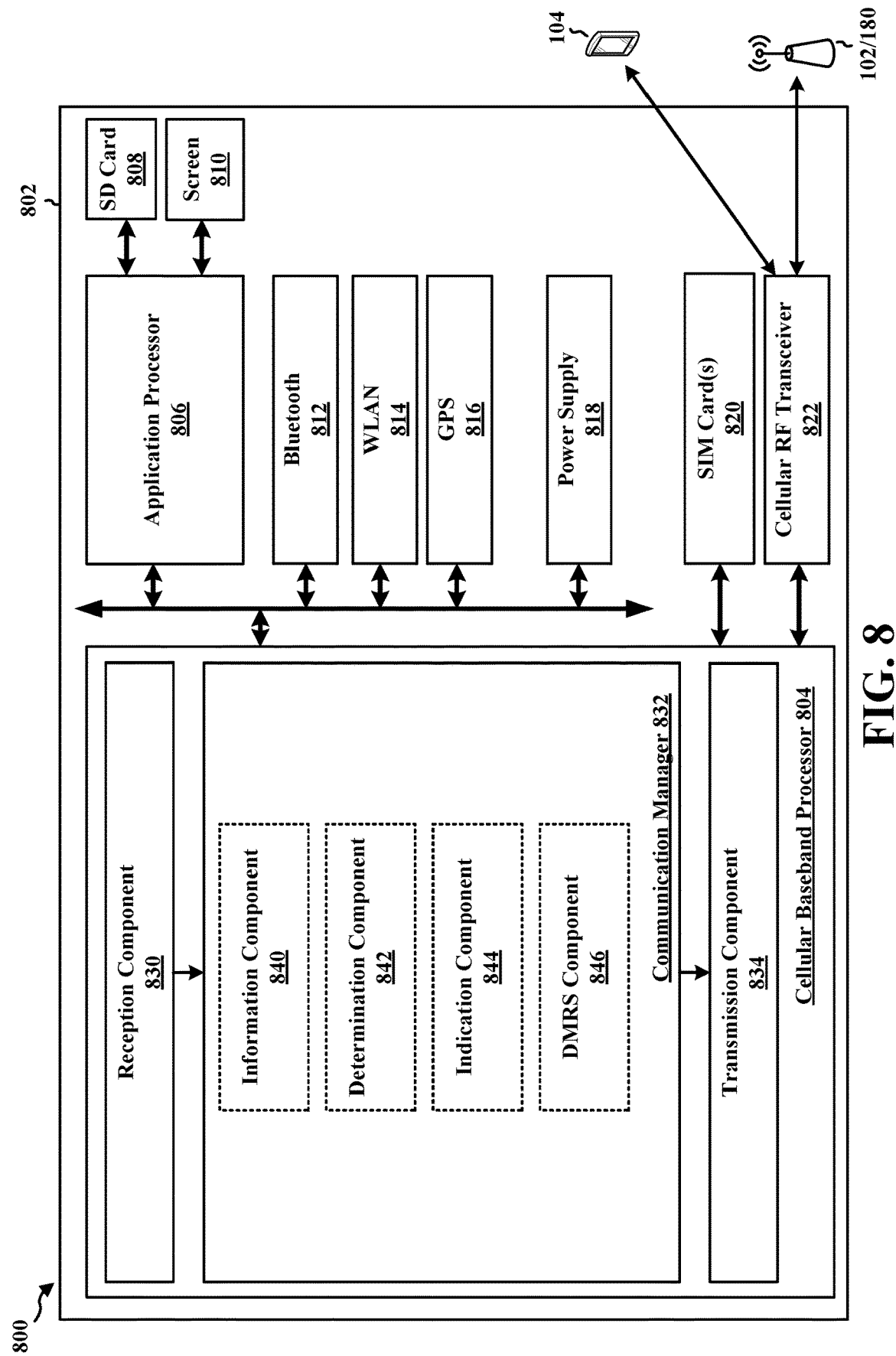
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes an information component 840 that is configured to receive, from a base station, information including first resources for first uplink data and second resources for second uplink data, where at least a portion of the second resources overlaps in time with the first resources, and where the first uplink data and the second uplink data are associated with different priority levels, e.g., as described in connection with 704 of FIG. 7. The communication manager 832 further includes a determination component 842 that receives input in the form of information from the information component 840 and is configured to determine whether to multiplex the second uplink data with the first uplink data based on a transmission timing difference between a scheduled transmission time for the second uplink data on the second resources and a multiplexed transmission time for the second uplink data on the first resources, e.g., as described in connection with 706 of FIG. 7. The communication manager 832 further includes an indication component 844 that is configured to receive an indication from the base station to determine whether to multiplex the second uplink data with the first uplink data based on the transmission timing difference, e.g., as described in connection with 702 of FIG. 7. The determination component 842 may further receive input in the form of the indication from the indication component 844, and the determination component may be further configured to determine whether to multiplex the second uplink transmission with the first uplink transmission based on the indication. The communication manager 832 additionally includes a DMRS component 846 that receives input in the form of a multiplexing decision from the determination component 842 and is configured to transmit a first DMRS and a second DMRS following the first DMRS on a PUSCH with the second uplink data being multiplexed on the PUSCH starting in symbols closer to the first DMRS than to the second DMRS, e.g., as described in connection with 708 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a base station, information including first resources for first uplink data and second resources for second uplink data, where at least a portion of the second resources overlaps in time with the first resources, and where the first uplink data and the second uplink data are associated with different priority levels. The apparatus 802, and in particular the cellular baseband processor 804, also includes means for determining whether to multiplex the second uplink data with the first uplink data based on a transmission timing difference between a scheduled transmission time for the second uplink data on the second resources and a multiplexed transmission time for the second uplink data on the first resources. In one configuration, the apparatus 802, and in particular the cellular baseband processor 804, may include means for transmitting a first DMRS and a second DMRS following the first DMRS on a PUSCH, where the second uplink data is multiplexed on the PUSCH starting in symbols closer to the first DMRS than to the second DMRS. In one configuration, the apparatus 802, and in particular the cellular baseband processor 804, may include means for receiving an indication from the base station to determine whether to multiplex the second uplink data with the first uplink data based on the transmission timing difference, where the determining is further based on the indication.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
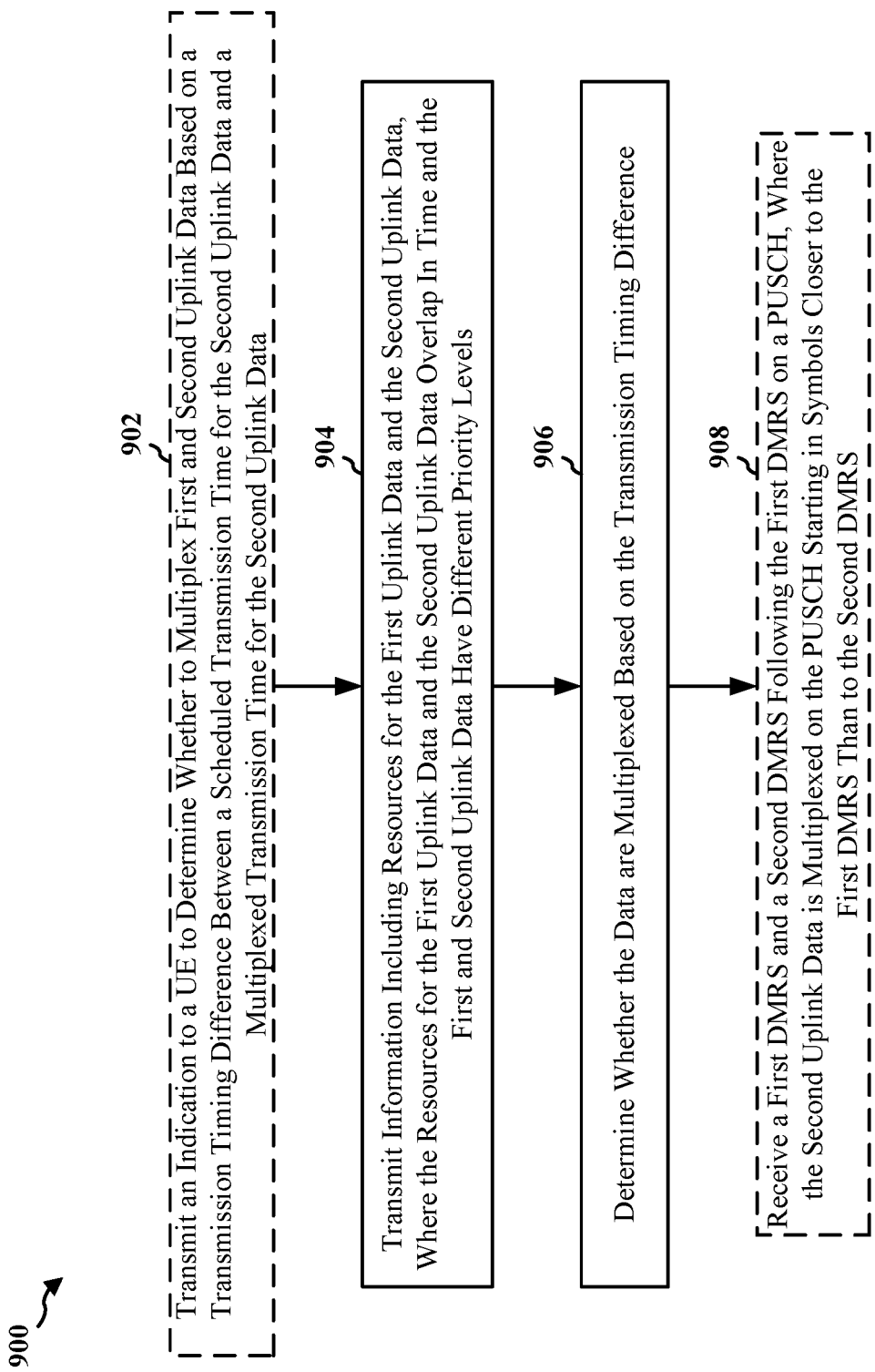
FIG. 9 is a flow chart of a method of wireless communication at a base station.

FIG. 9 is a flowchart 900 of a method of wireless communication. The method may be performed by a base station (e.g., the base station 102/180, 604; the apparatus 1002). Optional aspects are illustrated in dashed lines. The method allows a base station to determine whether a UE may drop lower priority, first uplink data (e.g., UL-SCH data or control information), or multiplex higher priority, second uplink data (UCI) at least partially overlapping with the lower priority first uplink data, based on a transmission timing difference between scheduled and multiplexed transmission times of the second uplink data.

At 902, the base station may transmit an indication to the UE to determine whether to multiplex the second uplink data with the first uplink data based on the transmission timing difference. For example, 902 may be performed by indication component 1044. For instance, referring to FIG. 6, base station 604 may transmit an indication 606 to UE 602 that configures (e.g., triggers, enables or allows) the UE to perform UCI multiplexing based on transmission timing differences between a higher priority scheduled UCI and a multiplexed UCI on a lower priority uplink channel (e.g., an overlapping PUSCH or PUCCH).

At 904, the base station transmits, to the UE, information including first resources for first uplink data and second resources for second uplink data, where at least a portion of the second resources overlaps in time with the first resources. For example, 904 may be performed by information component 1040. In one example, the first uplink data may comprise data scheduled for transmission in the first resources on a PUSCH, and the second uplink data may comprise UCI scheduled for transmission in the second resources on a PUCCH. For instance, the second uplink data may include a HARQ-ACK. For example, referring to FIGS. 4-6, base station 604 may transmit information 610 to UE 602 scheduling first uplink transmission 622 in allocated time-frequency resources, such as a grant scheduling UL- SCH data in slots, symbols, or RBs of PUSCH 406, 506, and information 610 scheduling second uplink transmission 624 in allocated time-frequency resources, such as another grant scheduling UCI (e.g., HARQ-ACK) in slots, symbols, or RBs of PUCCH 404 (e.g., scheduled UCI 502). Moreover, referring to FIG. 5, at least a portion of the resources including scheduled UCI 502 on PUCCH may overlap in time with the resources including data on PUSCH 506. For instance, as illustrated in FIG. 5, at least one symbol of the HARQ-ACK may overlap in time with at least one symbol of UL-SCH data on the PUSCH 506.

In another example, the first uplink data may comprise first UCI scheduled for transmission in the first resources on a first PUCCH, and the second uplink transmission may comprise second UCI scheduled for transmission in the second resources on a second PUCCH. For example, base station 604 may transmit information 610 to UE 602 scheduling first uplink transmission 622, such as a grant scheduling UCI on PUCCH, and information 610 scheduling second uplink transmission 624, such as another grant scheduling another UCI (e.g., HARQ-ACK) on another PUCCH (e.g., scheduled UCI 502). Moreover, referring to FIG. 5, at least a portion of scheduled UCI 502 on PUCCH may overlap in time with the other UCI on the other PUCCH.

The first uplink data and the second uplink data are associated with different priority levels. For instance, the different priority levels may include a first priority level associated with the first uplink data and a second priority level associated with the second uplink data, where the second priority level is higher than the first priority level. For example, referring to FIG. 5, the UL-SCH data on PUSCH 506 may be associated with a low priority index (e.g., priority index 1), while scheduled UCI 502 may include a HARQ-ACK configured with a high priority index (e.g., priority index 0). Moreover, referring to FIG. 6, the priority levels 611 associated with the higher priority UCI or lower priority uplink transmission may be provided in information 610. For example, information 610 may include an RRC configuration or parameter, or a DCI priority indicator field, that indicates a priority index for each of the uplink transmissions (e.g., priority index 1 for the first uplink transmission and priority index 0 for the second uplink transmission).

At 906, the base station determines whether the second uplink data is multiplexed with the first uplink data based on a transmission timing difference between a scheduled transmission time for the second uplink data on the second resources and a multiplexed transmission time for the second uplink data on the first resources. For example, 906 may be performed by determination component 1042. The base station may determine the second uplink data is multiplexed with the first uplink data when the transmission timing difference is smaller than a threshold. The threshold may be transmitted in a RRC configuration to the UE. For example, referring to FIG. 6, at 612, base station 604 may determine whether UE 602 will multiplex the second uplink transmission 624 with the first uplink transmission 622. In particular, referring to FIG. 5, the base station may determine whether the UE will transmit the higher priority scheduled UCI 502 on PUCCH (and drop the lower priority PUSCH transmission), or whether the UE will multiplex the UCI and transmit multiplexed UCI 504 on PUSCH 506 (and cancel the PUCCH transmission), by comparing one or more transmission timing differences 518, 524 between the scheduled UCI 502 and the multiplexed UCI 504 against one or more thresholds. For example, referring to FIG. 6, at 614, the base station may determine that the UE will multiplex higher priority UCI with lower priority UL-SCH data or control information when a transmission timing difference between a scheduled transmission time for the higher priority UCI and a multiplexed transmission time for the higher priority UCI is smaller than one or more transmission timing difference thresholds 608. The threshold(s) may be timeline-related value(s) configured by the base station (e.g. via RRC), including a transmission start delay threshold (e.g. X) and/or a transmission end delay threshold (e.g. Y).

In one example, the scheduled transmission time may comprise a scheduled start time of the second uplink data and the multiplexed transmission time may comprise a multiplexed start time of the second uplink data. In another example, the scheduled transmission time may comprise a scheduled end time of the second uplink data and the multiplexed transmission time may comprise a multiplexed end time of the second uplink data. In a further example, the scheduled transmission time may comprise a scheduled end time of the second uplink data and the multiplexed transmission time may comprise a multiplexed end time of the second uplink data, and the determining at 906 may be further based on another transmission timing difference between a scheduled start time of the second uplink data and a multiplexed start time of the second uplink data. For instance, referring to FIG. 5, the UE and base station may determine the transmission start time 514 for scheduled UCI 502 on PUCCH and the transmission start time 516 for multiplexed UCI 504 on PUSCH 506, identify the transmission timing difference 518 based on the transmission start times 514, 516, and compare the transmission timing difference 518 against the transmission start delay threshold. Alternatively or additionally, the UE and base station may determine the transmission end time 520 for scheduled UCI 502 on PUCCH and the transmission end time 522 for multiplexed UCI 504 on PUSCH 506, identify the transmission timing difference 524 based on the transmission end times 520, 522, and compare the transmission timing difference 524 against the transmission end delay threshold. If the transmission timing difference(s) 518, 524 are less than the respective threshold(s) 608, the base station 604 may determine that the UE 602 will multiplex the higher priority UCI with the lower priority data on PUSCH 506 (or on the other PUCCH) and cancel the PUCCH transmission. Thus, the UE may transmit and the base station may receive multiplexed uplink transmission 620. Otherwise, the base station may determine that the UE will drop the lower priority transmission (i.e. first uplink transmission 622) and transmit the higher priority scheduled UCI on PUCCH (i.e. the second uplink transmission 624) without UCI multiplexing.

The determining at 906 may also be based on the indication received at 902. For instance, referring to FIG. 6, indication 606 may be a flag, bit, or field in a RRC message, a DCI, or some other message that, when set to one value, configures the UE to perform UCI multiplexing based on the transmission timing differences, and when reset to another value, configures the UE to perform UCI multiplexing regardless of the transmission timing differences.

Finally, at 908, the base station may receive a first DMRS and a second DMRS following the first DMRS on a PUSCH. For example, 908 may be performed by DMRS component 1046. The second uplink data may be multiplexed on the PUSCH starting in symbols closer to the first DMRS than to the second DMRS. For instance, referring to FIG. 5, in addition to receiving UL-SCH data on PUSCH 506, the base station may receive DMRS in different symbols of the PUSCH, including a first DMRS 508 earlier in time and a second DMRS 510 later in time. The base station may receive the multiplexed UCI starting in symbols 512 closer to the first DMRS 508 than to the second DMRS 510.

Figure 10:
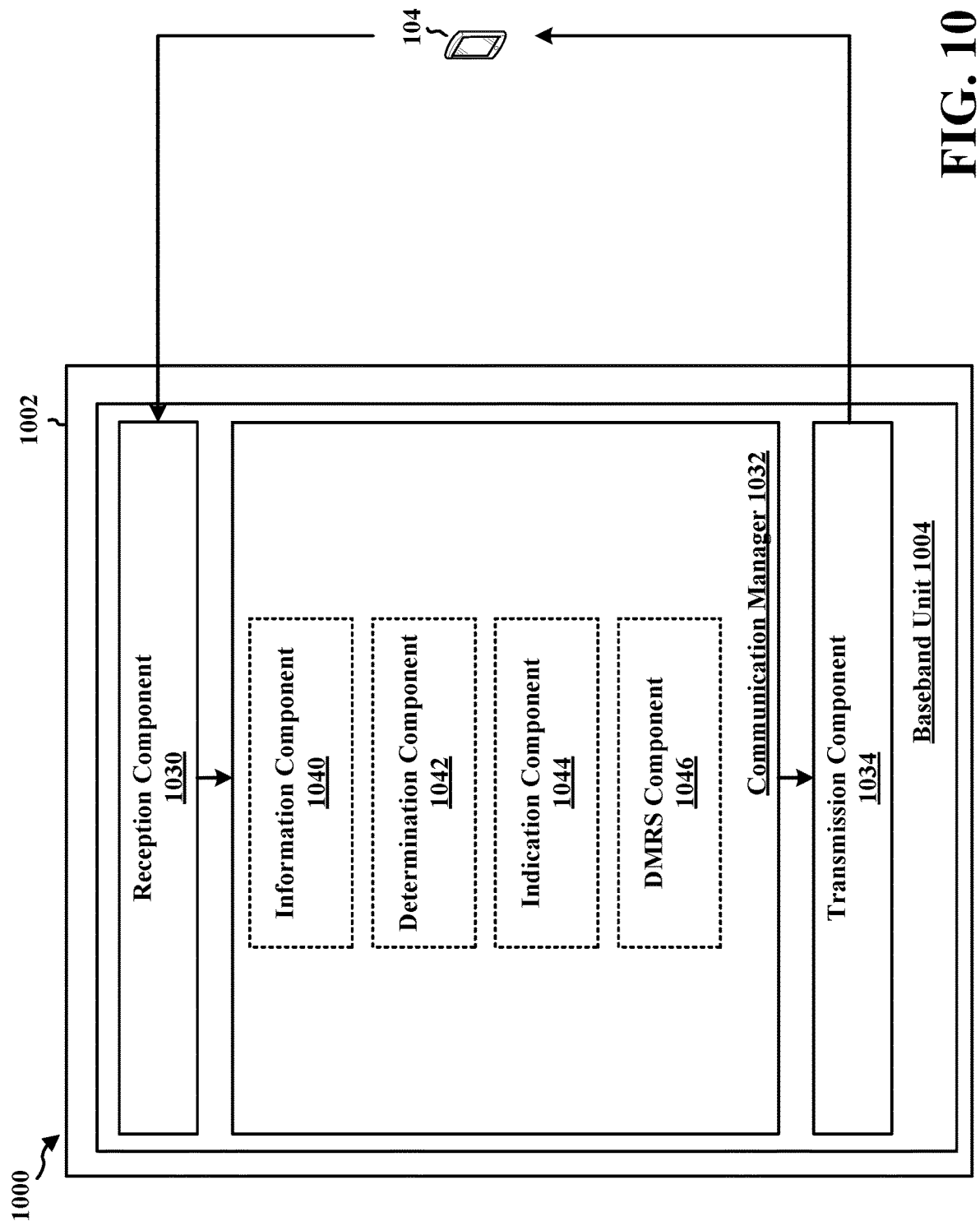
FIG. 10 is a diagram illustrating another example of a hardware implementation for another example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes an information component 1040 that is configured to transmit, to a UE, information including first resources for first uplink data and second resources for second uplink data, where at least a portion of the second resources overlaps in time with the first resources, and where the first uplink data and the second uplink data are associated with different priority levels, e.g., as described in connection with 904 of FIG. 9. The communication manager 1032 further includes a determination component 1042 that receives input in the form of information from the information component 1040 and is configured to determine whether the second uplink data is multiplexed with the first uplink data based on a transmission timing difference between a scheduled transmission time for the second uplink data on the second resources and a multiplexed transmission time for the second uplink data on the first resources, e.g., as described in connection with 906 of FIG. 9. The communication manager 1032 further includes an indication component 1044 that is configured to transmit an indication to the UE to determine whether the second uplink data is multiplexed with the first uplink data based on the transmission timing difference, e.g., as described in connection with 902 of FIG. 9. The determination component 1042 may further receive input in the form of the indication from the indication component 1044, and the determination component may be further configured to determine whether the second uplink data is multiplexed with the first uplink data based on the indication. The communication manager 1032 additionally includes a DMRS component 1046 that receives input in the form of a multiplexing decision from the determination component 1042 and is configured to receive a first DMRS and a second DMRS following the first DMRS on a PUSCH with the second uplink data being multiplexed on the PUSCH starting in symbols closer to the first DMRS than to the second DMRS, e.g., as described in connection with 908 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to a UE, information including first resources for first uplink data and second resources for second uplink data, where at least a portion of the second resources overlaps in time with the first resources, and where the first uplink data and the second uplink data are associated with different priority levels. The apparatus 1002, and in particular the baseband unit 1004, also includes means for determining whether the second uplink data is multiplexed with the first uplink data based on a transmission timing difference between a scheduled transmission time for the second uplink data on the second resources and a multiplexed transmission time for the second uplink data on the first resources. In one configuration, the apparatus 1002, and in particular the baseband unit 1004, may include means for receiving a first DMRS and a second DMRS following the first DMRS on a PUSCH, where the second uplink data is multiplexed on the PUSCH starting in symbols closer to the first DMRS than to the second DMRS. In one configuration, the apparatus 1002, and in particular the baseband unit 1004, may include means for transmitting an indication to the UE to determine whether to multiplex the second uplink data with the first uplink data based on the transmission timing difference, where the determining is further based on the indication.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow for multiplexing of higher priority uplink transmissions with lower priority uplink transmissions while maintaining URLLC of the higher priority transmissions. UEs that multiplex higher priority UCI with lower priority UL-SCH data on an overlapping PUSCH, or with other lower priority UCI on an overlapping PUCCH, may fail to meet URLLC latency requirements if the delay between the higher and lower priority transmissions are too long. Therefore, by allowing UEs and base stations to determine whether to multiplex higher priority UCI in such situations based on transmission timing differences between the scheduled and multiplexed transmission times of the higher priority UCI, URLLC requirements may be factored into a UCI multiplexing determination. Moreover, basing the determination on UCI transmission start times, UCI transmission end times, or both may improve the likelihood of maintaining URLLC in various situations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving, from a base station, information including first resources for first uplink data and second resources for second uplink data, wherein at least a portion of the second resources overlaps in time with the first resources, and wherein the first uplink data and the second uplink data are associated with different priority levels; and determining whether to multiplex the second uplink data with the first uplink data based on a transmission timing difference between a scheduled transmission time for the second uplink data on the second resources and a multiplexed transmission time for the second uplink data on the first resources.

Example 2 is the method of Example 1, wherein the first uplink data comprises data scheduled for transmission in the first resources on a physical uplink shared channel (PUSCH), and wherein the second uplink data comprises uplink control information (UCI) scheduled for transmission in the second resources on a physical uplink control channel (PUCCH).

Example 3 is the method of Example 1, wherein the first uplink data comprises first uplink control information (UCI) scheduled for transmission in the first resources on a first physical uplink control channel (PUCCH), and wherein the second uplink data comprises second UCI scheduled for transmission in the second resources on a second PUCCH.

Example 4 is the method of any of Examples 1 to 3, wherein the different priority levels include a first priority level associated with the first uplink data and a second priority level associated with the second uplink data, wherein the second priority level is higher than the first priority level.

Example 5 is the method of any of Examples 1 to 4, further comprising transmitting a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

Example 6 is the method of any of Examples 1 to 5, further comprising: receiving an indication from the base station to determine whether to multiplex the second uplink data with the first uplink data based on the transmission timing difference, wherein the determining is further based on the indication.

Example 7 is the method of any of Examples 1 to 6, wherein the second uplink data is multiplexed with the first uplink data when the transmission timing difference is smaller than a threshold.

Example 8 is the method of Example 7, wherein the threshold is received in a radio resource control (RRC) configuration from the base station.

Example 9 is the method of any of Examples 1 to 8, wherein the scheduled transmission time comprises a scheduled start time of the second uplink data and the multiplexed transmission time comprises a multiplexed start time of the second uplink data.

Example 10 is the method of any of Examples 1 to 8, wherein the scheduled transmission time comprises a scheduled end time of the second uplink data and the multiplexed transmission time comprises a multiplexed end time of the second uplink data.

Example 11 is the method of Example 10, wherein the determining is further based on another transmission timing difference between a scheduled start time of the second uplink data and a multiplexed start time of the second uplink data.

Example 12 is an apparatus for wireless communication, comprising: a processor; memory coupled with the processor; and instructions stored in the memory and operable, when executed by the processor, to cause the apparatus to: receive, from a base station, information including first resources for first uplink data and second resources for second uplink data, wherein at least a portion of the second resources overlaps in time with the first resources, and wherein the first uplink data and the second uplink data are associated with different priority levels; and determine whether to multiplex the second uplink data with the first uplink data based on a transmission timing difference between a scheduled transmission time for the second uplink data on the second resources and a multiplexed transmission time for the second uplink data on the first resources.

Example 13 is the apparatus of Example 12, wherein the instructions, when executed by the processor, further cause the apparatus to transmit a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

Example 14 is the apparatus of Examples 12 or 13, wherein the instructions, when executed by the processor, further cause the apparatus to receive an indication from the base station to determine whether to multiplex the second uplink data with the first uplink data based on the transmission timing difference, wherein the determining is further based on the indication.

Example 15 is the apparatus of any of Examples 12 to 14, wherein the second uplink data is multiplexed with the first uplink data when the transmission timing difference is smaller than a threshold.

Example 16 is a method of wireless communication at a base station, comprising: transmitting, to a user equipment (UE), information including first resources for first uplink data and second resources for second uplink data, wherein at least a portion of the second resources overlaps in time with the first resources, and wherein the first uplink data and the second uplink data are associated with different priority levels; and determining whether the second uplink data is multiplexed with the first uplink data based on a transmission timing difference between a scheduled transmission time for the second uplink data on the second resources and a multiplexed transmission time for the second uplink data on the first resources.

Example 17 is the method of Example 16, wherein the first uplink data comprises data scheduled for transmission in the first resources on a physical uplink shared channel (PUSCH), and wherein the second uplink data comprises uplink control information (UCI) scheduled for transmission in the second resources on a physical uplink control channel (PUCCH).

Example 18 is the method of Example 16, wherein the first uplink data comprises first uplink control information (UCI) scheduled for transmission in the first resources on a first physical uplink control channel (PUCCH), and wherein the second uplink data comprises second UCI scheduled for transmission in the second resources on a second PUCCH.

Example 19 is the method of any of Examples 16 to 18, wherein the different priority levels include a first priority level associated with the first uplink data and a second priority level associated with the second uplink data, wherein the second priority level is higher than the first priority level.

Example 20 is the method of any of Examples 16 to 19, further comprising receiving a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

Example 21 is the method of any of Examples 16 to 20, further comprising: transmitting an indication to the UE to determine whether to multiplex the second uplink data with the first uplink data based on the transmission timing difference, wherein the determining is further based on the indication.

Example 22 is the method of any of Examples 16 to 21, wherein the second uplink data is multiplexed with the first uplink data when the transmission timing difference is smaller than a threshold.

Example 23 is the method of Example 22, wherein the threshold is transmitted in a radio resource control (RRC) configuration to the UE.

Example 24 is the method of any of Examples 16 to 23, wherein the scheduled transmission time comprises a scheduled start time of the second uplink data and the multiplexed transmission time comprises a multiplexed start time of the second uplink data.

Example 25 is the method of any of Examples 16 to 23, wherein the scheduled transmission time comprises a scheduled end time of the second uplink data and the multiplexed transmission time comprises a multiplexed end time of the second uplink data.

Example 26 is the method of Example 25, wherein the determining is further based on another transmission timing difference between a scheduled start time of the second uplink data and a multiplexed start time of the second uplink data.

Example 27 is an apparatus for wireless communication, comprising: a processor; memory coupled with the processor; and instructions stored in the memory and operable, when executed by the processor, to cause the apparatus to: transmit, to a user equipment (UE), information including first resources for first uplink data and second resources for second uplink data, wherein at least a portion of the second resources overlaps in time with the first resources, and wherein the first uplink data and the second uplink data are associated with different priority levels; and determine whether the second uplink data is multiplexed with the first uplink data based on a transmission timing difference between a scheduled transmission time for the second uplink data on the second resources and a multiplexed transmission time for the second uplink data on the first resources.

Example 28 is the apparatus of Example 27, wherein the instructions, when executed by the processor, further cause the apparatus to receive a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

Example 29 is the apparatus of Example 27 or 28, wherein the instructions, when executed by the processor, further cause the apparatus to transmit an indication to the UE to determine whether to multiplex the second uplink data with the first uplink data based on the transmission timing difference, wherein the determining is further based on the indication.

Example 30 is the apparatus of any of Examples 27 to 29, wherein the second uplink data is multiplexed with the first uplink data when the transmission timing difference is smaller than a threshold.

What is claimed is:

1. A method of wireless communication at a user equipment (UE), comprising:
   receiving, from a base station, information including first resources for first uplink data and second resources for second uplink data, wherein at least a portion of the second resources overlaps in time with the first resources, and wherein the first uplink data and the second uplink data are associated with different priority levels;
   determining whether to multiplex the second uplink data with the first uplink data based on a transmission timing difference between a first transmission time for the second uplink data when scheduled on the second resources and a second transmission time for the second uplink data when multiplexed on the first resources;

transmitting the first uplink data multiplexed with the second uplink data on the first resources, or dropping transmission of the first uplink data and transmitting the second uplink data on the second resources, based on the determination; and transmitting a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

2. The method of claim 1, wherein the first uplink data comprises data scheduled for transmission in the first resources on a physical uplink shared channel (PUSCH), and wherein the second uplink data comprises uplink control information (UCI) scheduled for transmission in the second resources on a physical uplink control channel (PUCCH).

3. The method of claim 1, wherein the first uplink data comprises first uplink control information (UCI) scheduled for transmission in the first resources on a first physical uplink control channel (PUCCH), and wherein the second uplink data comprises second UCI scheduled for transmission in the second resources on a second PUCCH.

4. The method of claim 1, wherein the different priority levels include a first priority level associated with the first uplink data and a second priority level associated with the second uplink data, wherein the second priority level is higher than the first priority level.

5. The method of claim 1, further comprising:
receiving an indication from the base station to determine whether to multiplex the second uplink data with the first uplink data based on the transmission timing difference, wherein the determining is further based on the indication.

6. The method of claim 1, wherein the second uplink data is multiplexed with the first uplink data when the transmission timing difference is smaller than a threshold.

7. The method of claim 6, wherein the threshold is received in a radio resource control (RRC) configuration from the base station.

8. The method of claim 1, wherein the first transmission time comprises a scheduled start time of the second uplink data and the second transmission time comprises a multiplexed start time of the second uplink data.

9. The method of claim 1, wherein the first transmission time comprises a scheduled end time of the second uplink data and the second transmission time comprises a multiplexed end time of the second uplink data.

10. The method of claim 9, wherein the determining is further based on another transmission timing difference between a scheduled start time of the second uplink data and a multiplexed start time of the second uplink data.

11. The method of claim 1, wherein the first transmission time is a time corresponding to a first symbol or a last symbol of a hybrid automatic repeat request (HARQ) acknowledgment (HARQ-ACK) triggered in response to a physical downlink shared channel (PDSCH) reception scheduled by a physical downlink control channel (PDCCH), the second uplink data including the HARQ-ACK, and the second transmission time is a time corresponding to the first symbol or the last symbol of the HARQ-ACK when the HARQ-ACK is multiplexed with uplink shared channel (UL-SCH) data on a physical uplink shared channel (PUSCH), the first resources including the PUSCH.

12. An apparatus for wireless communication, comprising:
one or more processors;
one or more memories each coupled with at least one of the one or more processors; and
instructions stored in the one or more memories and operable, when executed by the one or more processors individually or in combination, to cause the apparatus to:
receive, from a base station, information including first resources for first uplink data and second resources for second uplink data, wherein at least a portion of the second resources overlaps in time with the first resources, and wherein the first uplink data and the second uplink data are associated with different priority levels;
determine whether to multiplex the second uplink data with the first uplink data based on a transmission timing difference between a first transmission time for the second uplink data when scheduled on the second resources and a second transmission time for the second uplink data when multiplexed on the first resources; and
transmit the first uplink data multiplexed with the second uplink data on the first resources, or drop transmission of the first uplink data and transmit the second uplink data on the second resources, based on the determination;
wherein the instructions, when executed by the one or more processors individually or in combination, further cause the apparatus to transmit a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

13. The apparatus of claim 12, wherein the instructions, when executed by the one or more processors individually or in combination, further cause the apparatus to receive an indication from the base station to determine whether to multiplex the second uplink data with the first uplink data based on the transmission timing difference, wherein the determining is further based on the indication.

14. The apparatus of claim 12, wherein the second uplink data is multiplexed with the first uplink data when the transmission timing difference is smaller than a threshold.

15. A method of wireless communication at a base station, comprising:
transmitting, to a user equipment (UE), information including first resources for first uplink data and second resources for second uplink data, wherein at least a portion of the second resources overlaps in time with the first resources, and wherein the first uplink data and the second uplink data are associated with different priority levels;
determining whether the second uplink data is multiplexed with the first uplink data based on a transmission timing difference between a first transmission time for the second uplink data when scheduled on the second resources and a second transmission time for the second uplink data when multiplexed on the first resources;

receiving the first uplink data multiplexed with the second uplink data on the first resources, or receiving the second uplink data on the second resources without receiving a transmission of the first uplink data on the first resources, based on the determination; and receiving a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

16. The method of claim 15, wherein the first uplink data comprises data scheduled for transmission in the first resources on a physical uplink shared channel (PUSCH), and wherein the second uplink data comprises uplink control information (UCI) scheduled for transmission in the second resources on a physical uplink control channel (PUCCH).

17. The method of claim 15, wherein the first uplink data comprises first uplink control information (UCI) scheduled for transmission in the first resources on a first physical uplink control channel (PUCCH), and wherein the second uplink data comprises second UCI scheduled for transmission in the second resources on a second PUCCH.

18. The method of claim 15, wherein the different priority levels include a first priority level associated with the first uplink data and a second priority level associated with the second uplink data, wherein the second priority level is higher than the first priority level.

19. The method of claim 15, further comprising:
transmitting an indication to the UE to determine whether to multiplex the second uplink data with the first uplink data based on the transmission timing difference, wherein the determining is further based on the indication.

20. The method of claim 15, wherein the second uplink data is multiplexed with the first uplink data when the transmission timing difference is smaller than a threshold.

21. The method of claim 20, wherein the threshold is transmitted in a radio resource control (RRC) configuration to the UE.

22. The method of claim 15, wherein the first transmission time comprises a scheduled start time of the second uplink data and the second transmission time comprises a multiplexed start time of the second uplink data.

23. The method of claim 15, wherein the first transmission time comprises a scheduled end time of the second uplink data and the second transmission time comprises a multiplexed end time of the second uplink data.

24. The method of claim 23, wherein the determining is further based on another transmission timing difference between a scheduled start time of the second uplink data and a multiplexed start time of the second uplink data.

25. An apparatus for wireless communication, comprising:
one or more processors;
one or more memories each coupled with at least one of the one or more processors; and
instructions stored in the one or more memories and operable, when executed by the one or more processors individually or in combination, to cause the apparatus to:
transmit, to a user equipment (UE), information including first resources for first uplink data and second resources for second uplink data, wherein at least a portion of the second resources overlaps in time with the first resources, and wherein the first uplink data and the second uplink data are associated with different priority levels;
determine whether the second uplink data is multiplexed with the first uplink data based on a transmission timing difference between a first transmission time for the second uplink data when scheduled on the second resources and a second transmission time for the second uplink data when multiplexed on the first resources; and
receive the first uplink data multiplexed with the second uplink data on the first resources, or receive the second uplink data on the second resources without receiving a transmission of the first uplink data on the first resources, based on the determination, wherein the instructions, when executed by the one or more processors individually or in combination, further cause the apparatus to receive a first demodulation reference signal (DMRS) and a second DMRS following the first DMRS on a physical uplink shared channel (PUSCH), wherein the second uplink data is multiplexed on the PUSCH starting in symbols closer to the first DMRS than to the second DMRS.

26. The apparatus of claim 25, wherein the instructions, when executed by the one or more processors individually or in combination, further cause the apparatus to transmit an indication to the UE to determine whether to multiplex the second uplink data with the first uplink data based on the transmission timing difference, wherein the determining is further based on the indication.

27. The apparatus of claim 25, wherein the second uplink data is multiplexed with the first uplink data when the transmission timing difference is smaller than a threshold.

* * * * *